Nov. 13, 1928.  
L. M. WALDEN  
1,691,217  
VEHICLE SUSPENSION MEANS  
Filed Aug. 4, 1923  
2 Sheets-Sheet 1
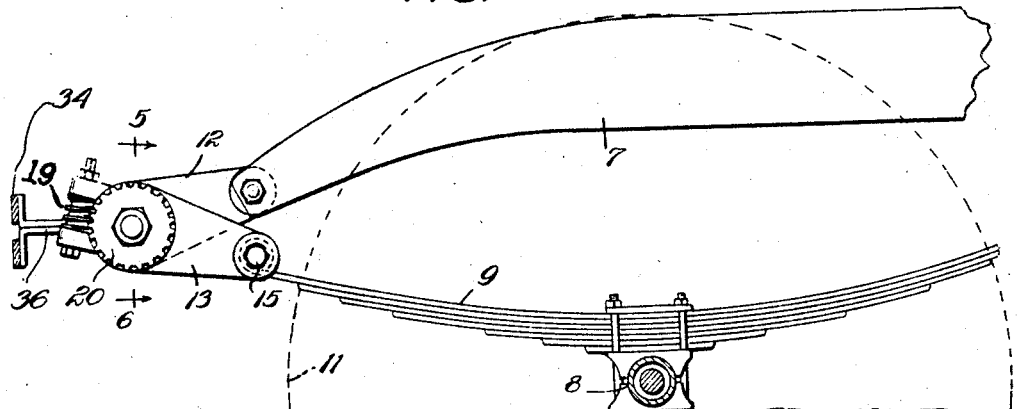
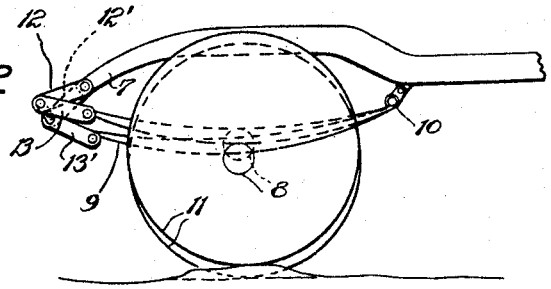
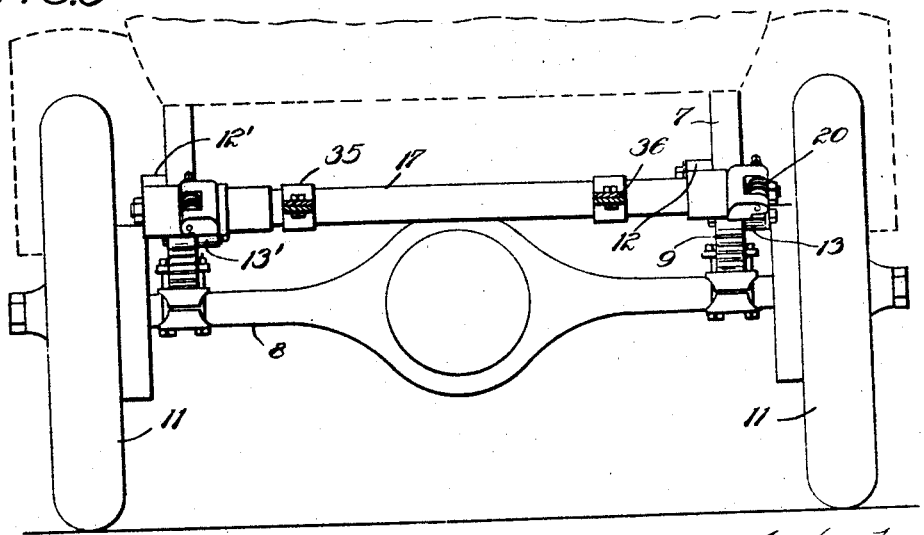
Witness:  
John E. Titus
Inventor  
Lester M. Walden Nov. 13, 1928.  
L. M. WALDEN  
1,691,217  
VEHICLE SUSPENSION MEANS  
Filed Aug. 4, 1923   2 Sheets-Sheet 2
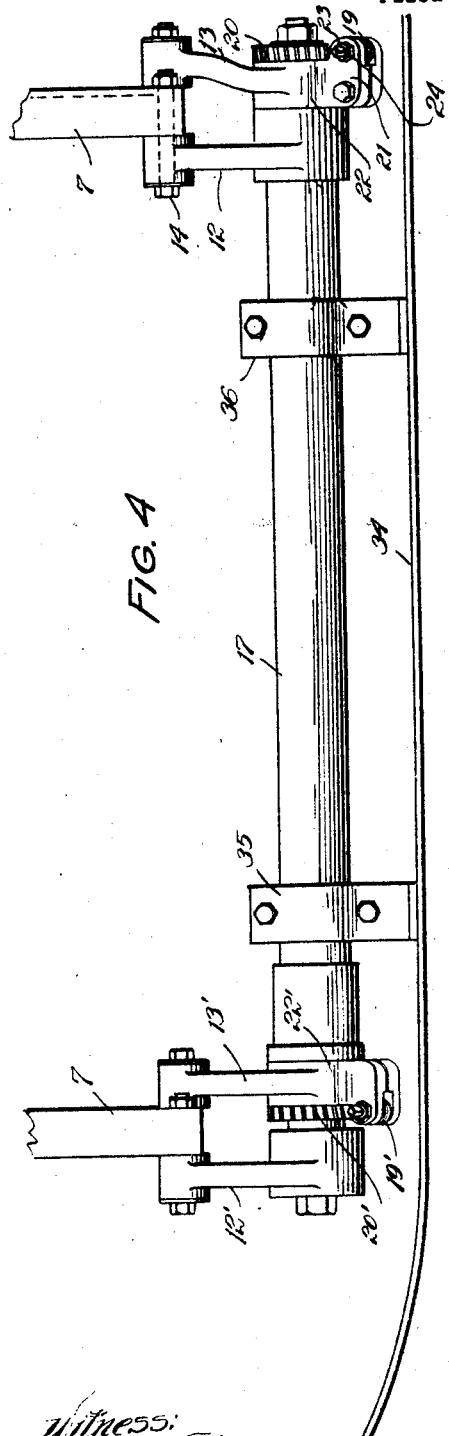
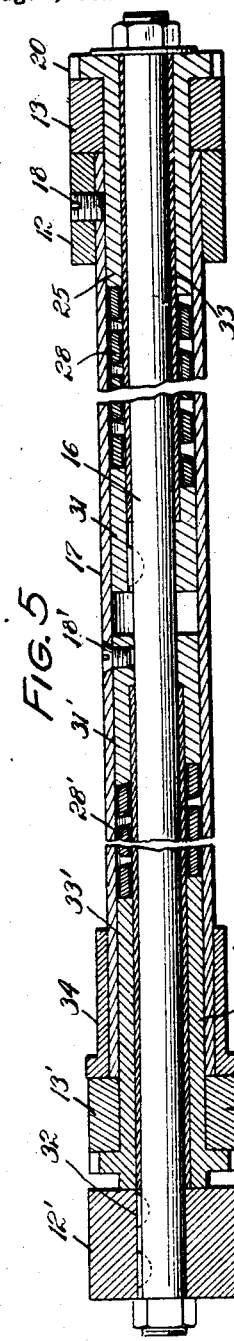
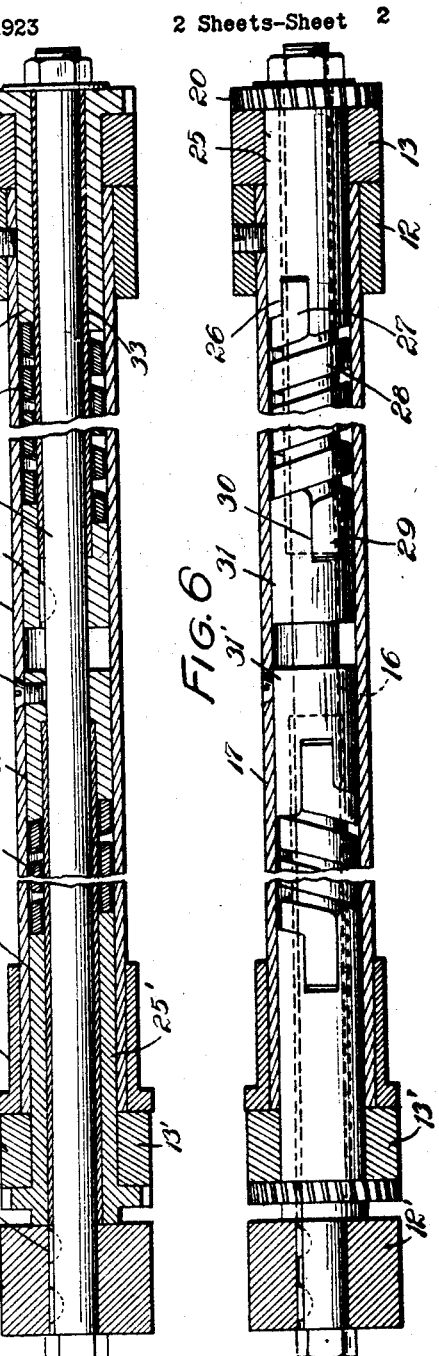
Inventor  
Lester M. Walden

Patented Nov. 13, 1928.

1,691,217

UNITED STATES PATENT OFFICE.

LESTER M. WALDEN, OF CHICAGO, ILLINOIS.

VEHICLE SUSPENSION MEANS.

Application filed August 4, 1923. Serial No. 655,573.

The invention pertains to motor vehicles and has especial reference to the means for yieldably supporting the body of such a vehicle upon its wheels.

The object of the invention, generally stated, is to provide a resilient connection between the body of a vehicle and its supporting wheels, which is adapted to distribute the strain caused by shocks received at either side of the vehicle to the opposite side thereof, whereby to resist a tilting tendency on the part of the body and thus support it with an equalizing action insuring stability and smoothness in operation while reducing to a minimum the twisting strains to which the body and its supporting frame are normally subjected.

A more specific object is to provide a suspension means which is capable of transmitting the up and down movements imparted to one end of a vehicle axle to the opposite end thereof with a reverse or compensating effect, so that as the distance between the body and the axle decreases at one side of the vehicle, such distance increases a corresponding amount at the opposite side of the vehicle, and vice versa, the result being that the body continues to be supported in its normal upright position notwithstanding the rising and falling movements of the opposite ends of the axle and its supporting wheels.

Still another object is to provide a suspension means of such construction that it is capable of functioning as a shock absorbing device, in that it operates to retard or resist the rebound following the striking of an elevation or depression in the roadway.

A further object of the invention is to provide means of the character indicated which is capable of being readily applied to vehicles now in common use, and which is of a thoroughly practical character from a manufacturing standpoint.

Still another object is to provide a device of the character indicated which also serves as a bumper.

The objects of the invention thus generally stated, together with other and ancillary advantages, may be attained by• the construction and arrangement illustrated in the accompanying drawings forming part hereof wherein:

Figure 1 is a side elevational view of my improved shock absorbing means illustrating its application to the frame and suspension spring of a motor vehicle.

Fig. 2 is a side elevational view partially diagrammatic in character illustrating the operation of the device.

Fig. 3 is a fragmentary rear end view of a motor vehicle having the device applied thereto and showing the bumper brackets in section.

Fig. 4 is a fragmentary plan view of the device illustrating the bumper mounting.

Figs. 5 and 6 are longitudinal sectional views taken substantially in the planes of line 5—6 of Fig. 1, certain of the parts being shown in elevation.

Referring to Fig. 1 of the drawings, 7 designates the chassis frame of a motor vehicle and 8 the rear axle between which and the frame is interposed the usual elliptical springs indicated at 9. Herein I have shown my invention as constituting the connection between the rear ends of the springs 9 and the body 7, the forward ends of the springs being connected to the body by means of shackles 10 in the usual way (Fig. 2). 11 indicates the rear vehicle wheels.

My improved suspension means comprises a pair of lever arms 12 and 13 at one side of the vehicle and a corresponding pair of arms 12' and 13' at the opposite side of the vehicle. The arms 12 and 12' are herein shown as connected at their forward ends to the rear end of the chassis frame 7, as by means of bolts 14, and the arms 13 and 13' are pivotally connected to the rear end of the springs 9 by means of bolts 15. The opposite ends of the arms 12 and 12' and 13 and 13' are mounted coaxially with respect to a shaft 16 and a concentrically arranged sleeve 17 both of a length such as to extend from side to side of the vehicle. The arm 12 is rigidly secured upon the sleeve 17 at the right hand side of the vehicle, as by means of a set screw 18, and the arm 13 is adjustably connected to the shaft 16, as for example, through the medium of a worm 19 and a worm wheel 20. The worm 19 is mounted between a pair of rearwardly extending portions 21 of a split collar 22 preferably formed integral with the arm 13, and a squared operating stem 23 rigid with the worm projects above the upper one of said portions 21 and is arranged to be locked by means of a lock-nut 24. Rigid with the worm wheel 20 is a tubular member 25 having in its inner end a notch 26 adapted to receive one end 27 of a torsion spring 28. The opposite or inner end 29 of said spring is adapted to enter a corresponding notch 30 in a member 31 keyed upon the shaft 16 substantially centrally thereof.

The arm 12' is rigidly secured upon the opposite end of the shaft 16 as by means of keys 32; and the arm 13' is adjustably connected to the sleeve 17 in a manner similar to that in which the arm 13 is connected to the shaft 16. Thus the arm 13' is formed integral with a split collar 22' carrying a worm 19' meshing with a worm wheel 20', the later being rigid with a tubular member 25' connected by means of a torsion spring 28' with a tubular member 31'. The latter instead of being connected to the shaft 16 is connected to the sleeve 17 by means of a set screw 18'.

It will be observed from the foregoing that the lever arms 12 and 13 on one of the arms are respectively connected to lever arms 13' and 12' on the opposite side thereof, through the medium on the one hand of the sleeve 17, the member 31', the coiled spring 28' and the tubular member 25', and through the medium on the other hand of the tubular member 25, spring 28, the member 31 and the shaft 16. Accordingly, when one of the rear vehicle wheels encounters an elevation or ridge in the roadway, so that the rear end of the suspension spring 9 moves upwardly, the ends of the arms 12 and 13 move toward each other while a movement of separation occurs between the ends of the arms 12' and 13', the converse being true when the opposite wheel encounters an obstruction such as to cause its elevation.

In this operation the movements of the lever arms on one side of the vehicle are transmitted through the springs 28—28' to the lever arms on the opposite side of the vehicle but with a reverse effect. For example, when the lower lever arm 13 swings upwardly toward the upper lever arm 12, the upper lever arm 12' connected therewith also swings upwardly but in a direction away from the lower lever arm 13'.

The result is that a shock received by one vehicle wheel is transmitted to the opposite vehicle wheel in a reverse direction, so that while the rear axle is forced into an inclined position the vehicle body is maintained in a true upright position. In other words, the up or down movement of one wheel with respect to the other is equalized by a corresponding movement of the other wheel in the opposite direction. Such transmission of the force of a shock, however, being effected through the springs 28, 28' is accomplished smoothly. Moreover, said springs 28 and 28' serve to cushion the shock even when received by one wheel only, for the reason that the movement of the two arms on one side of the vehicle toward each other is resisted by the springs and absorbed in their operation at the other side of the vehicle to effect a corresponding movement of separation between the arms with a resulting elevation of the vehicle body.

In the event that one of the wheels enters a depression in the roadway, the operation of the device is substantially the same, resulting in a movement toward each other of the arms on the opposite side of the vehicle and a movement of separation between the arms on the same side of the vehicle as the depression.

Should both wheels enter an elevation or depression simultaneously, the resulting shock it will be observed would be absorbed and sustained by both springs 28—28' acting alike.

In Fig. 5 I have shown a slight clearance between the outer periphery of the spring 28' and the sleeve 17, which it will be observed constitutes a housing for enclosing the springs. This clearance is preferably proportioned with respect to the expansion and contraction of the springs so that the springs are capable of contracting without frictional engagement with the inner peripheral wall of the sleeve, while a sudden expansion of the springs, such as occurs during the rebound resulting from a shock imparted to one or both wheels, causes the springs in expanding beyond their neutral points to engage frictionally with the inner periphery of the sleeve whereby to resist relative rotation between the parts and thus substantially overcoming the rebound.

It is contemplated that while my shock absorbing device would be used in connection with the ordinary suspension springs of a vehicle, the device may be depended upon entirely as a means for suspending the vehicle by substituting for the elliptical suspension springs other movable supports for the rear axle, it being apparent that the springs 9 herein shown constitute levers fulcrumed at their forward ends and transmitting the movements of the wheels to lever arms of the device. Obviously the springs 28, 28' are adjusted by their respective adjusting devices so as to be capable of withstanding the load of the body under normal conditions.

In Fig. 5 I have shown the members 25 and 31 and 25' and 31' as receiving elongated bushings 33 and 33' around which the springs 28 and 28' are coiled. These bushings thus serve to prevent frictional engagement between the springs and the shaft 16. 34 (Fig. 5) is a reinforcing member of the left hand end of the sleeve.

The device in itself may constitute an abutment or bumper, or may serve simply as a support for a bumper. Thus a bumper 34 of suitable construction (Figs. 1 and 4)

may be mounted upon the sleeve 17 by means of brackets 35 and 36.

I am aware that torsion springs have heretofore been employed in vehicle suspension means, but I believe that I am the first to have employed them in such a way that each acts between one side of a vehicle body and the wheel on the opposite side thereof, whereby both springs tend to resist relative movement between the wheels and the body whether the shocks is received by one wheel alone or by both simultaneously; and whereby, in the former case, not only is the shock absorbed by both springs, but is transmitted to the opposite side of the vehicle to accomplish a corresponding elevation or depression of the vehicle body at that side with an equalizing effect.

I claim as my invention:

1. The combination with a motor vehicle having a body, a rear axle and a pair of elliptical suspension springs pivoted at their forward ends to the body and connected between their ends to said axle, of resilient means connected between the opposite ends of said springs and the body, said means being operable to transmit relative movement between the spring and the body at one side thereof to the spring and body at the opposite side thereof but in a reverse direction.

2. The combination of a motor vehicle having a body, a rear axle and a pair of elliptical suspension springs pivoted at their forward ends to the body and connected between their ends to said axle, and means interposed between the rear ends of said springs and the body adapted to equalize the movement occurring between the springs and the body at opposite sides thereof but in opposite directions whereby to maintain the body in a substantially upright position.

3. The combination of a vehicle body, a wheel supporting axle, means connecting said axle to the body including a pair of elliptical spring members each having one end pivoted to the body, and means connecting the opposite ends of said members to the body including two pairs of lever arms, the corresponding arms of said pairs being connected for movement with the opposite arms of the other pair.

4. The combination of a vehicle body, a wheel supporting axle, means connecting said axle to the body including a pair of elliptical spring members each having one end pivoted to the body, and means connecting the opposite ends of said members to the body including two pairs of lever arms, the corresponding arms of said pairs being resiliently connected for movement with the opposite arms of the other pair.

5. The combination with a vehicle body and a pair of supporting wheels on opposite sides of said body mounted for up and down movement relative thereto, of means connecting the body and said supporting wheels at opposite sides of the body, said means comprising a pair of rotary elements arranged to rotate in opposite directions under the weight of the body, spring means for opposing such rotation of said two elements, and means for adjusting the tension of said spring means, the arrangement being such that relative movement in one direction between the body and a supporting wheel on one side of the vehicle produces relative movement in the opposite direction between the vehicle body and the supporting wheel at the opposite side of the vehicle.

6. A vehicle suspension means comprising a pair of coaxial elements mounted for relative rotation and adapted to be arranged transversely of a vehicle body so as to extend from side to side thereof, means acting upon the respective elements at opposite ends thereof to cause them to rotate in opposite directions, and spring means for opposing such relative rotation between said elements.

7. The combination with a vehicle body of supporting means mounted for up and down movement relative to said body, and resilient suspension means acting between said body and said supporting means to transmit relative movement occurring between said body and supporting means on one side of the vehicle to the other side of the vehicle with an equalizing effect, said suspension means including a pair of rotatable elements operatively connected together by a spring, one of said elements having a connection with the body on one side of the vehicle and the other having a connection with said supporting means on the other side of the vehicle.

8. The combination with a vehicle body and the wheel supporting axle thereof, of means operable to resist relative up and down movement between said body and axle, said means comprising a relatively rotatable shaft and tubular casing therefor a helical torsion spring within the casing about the shaft and secured at opposite ends to said members, said spring being adapted to contract in the movement of the axle toward the body and to expand in the movement of the axle away from the body sumultaneously with rotation of said members, the tubular casing encircling said spring being adapted for frictional engagement by the spring when expanding beyond its neutral point.

9. The combination with a vehicle body and the wheel supporting axles thereof, of means operable to resist relative up and down movement betwen said body and axle, said means including a helical torsion spring, and tubular means movable relatively to said spring axially thereof and adapted to be frictionally engaged by said spring while expanding whereby to resist movement between the body and the axle.

10. A vehicle suspension means comprising in combination a pair of relatively rotatable axially alined elements adapted for connection with the body of a vehicle and each element having a part having means connecting it with the wheels arranged to rotate said elements in opposite directions in relative movements occurring between the body and the wheels, said elements being constructed to provide an annular space between them, and means including a helical torsion spring arranged in said space and coacting with said elements whereby to resist rotary movement between said elements in opposite directions.

In testimony whereof, I have hereunto affixed my signature.

LESTER M. WALDEN.